S. W. SHOREY.
Cutting and Trimming Attachments for Sewing-Machines.
No. 148,765.  
Patented March 17, 1874.
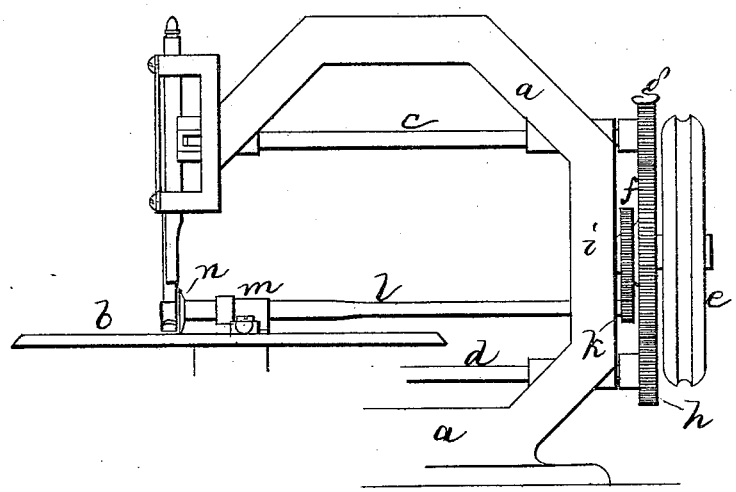
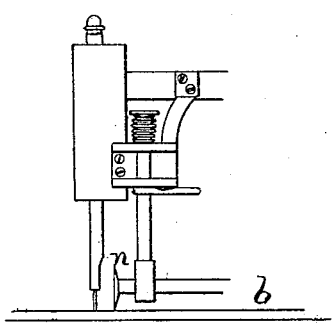
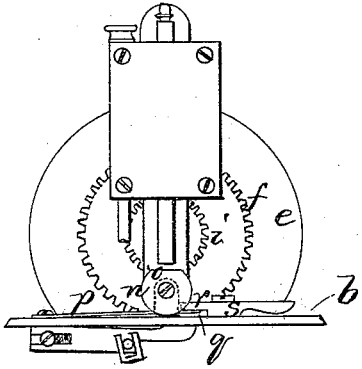
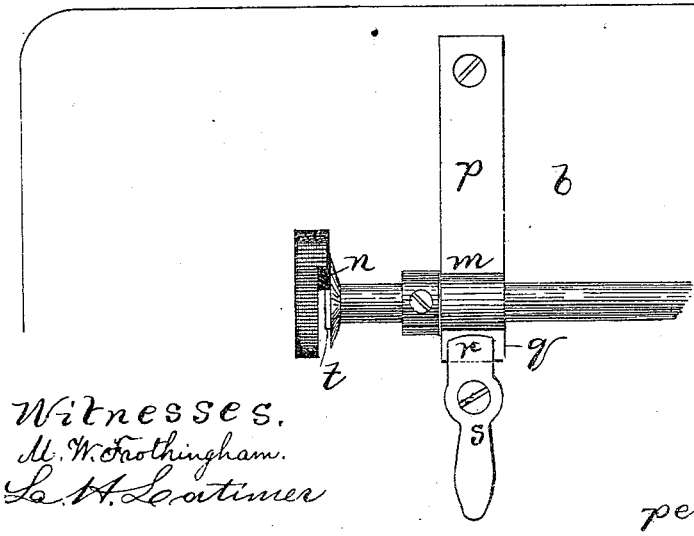
Witnesses.  
M. W. Frothingham.  
L. H. Latimer.
Inventor.  
Samuel W. Shorey.  
per Crosby & Gould  
attys
AM. PHOTO-LITHOGRAPHIC CO. N.Y. (OSBORNE'S PROCESS.)

UNITED STATES PATENT OFFICE.

SAMUEL W. SHOREY, OF BOSTON, MASSACHUSETTS.

IMPROVEMENT IN CUTTING AND TRIMMING ATTACHMENTS FOR SEWING-MACHINES.

Specification forming part of Letters Patent No. 148,765, dated March 17, 1874; application filed February 20, 1874.

*To all whom it may concern:*

Be it known that I, SAMUEL W. SHOREY, of Boston, in the county of Suffolk and State of Massachusetts, have invented an Improved Cutting and Trimming Attachment for Sewing-Machines; and I do hereby declare that the following, when taken in connection with the drawings which accompany and form part of this specification, is a description of my invention sufficient to enable those skilled in the art to practice it.

Cutting or trimming attachments have been applied, to some extent, to sewing-machines for the purpose of cutting off the edge of the work on a line equidistant from the seam, such attachments being particularly useful in machine-stitching leather. For such attachments a vertically-reciprocating cutter has sometimes been used, sometimes a rotary disk-cutter at the end of a horizontal shaft turning in stationary bearings, and sometimes a rotary disk-cutter having intermittent vertical movements, the cutter moving up just before the cloth is fed, and remaining up during the feed, it having been found that the cutter was a hinderance to the feed, and not so effective in its cutting operation, if in contact with the work during the feed. My invention has reference to the employment of a rotary disk-cutter at the end of a horizontal shaft, and to such an arrangement of the mechanism as shall throw the cutting-edge out of action during feeding of the work. For this purpose I journal my cutter-shaft in stationary bearings, (or bearings that are stationary while the machine is operating,) and I form the cutter with intermittent cutting-spaces, or with one or more breaks in the circular cutting-periphery, such break or breaks being so arranged that when the feed-bar moves laterally to feed the work a break of the cutter-wheel, instead of the cutting-edge, is adjacent to or immediately above the work-supporting table, there being then no obstacle to the feed and no drag of the work against the cutting-edge, the trimming being effected between the feed-movements of the feed-bar, or while the work is stationary. My invention consists, primarily, in combining, with the stitch-forming mechanism, a rotary cutter having a part or parts of its periphery eccentric to and within its cutting-periphery.

The drawing represents a machine embodying my invention.

Figure 1 shows the machine in front view. Fig. 2 is a side elevation of it. Fig. 3 is a plan of the work-supporting plate and feed-bar, and of the cutter and adjacent parts. Fig. 4 shows a modification in the arrangement of the cutter-shaft bearing.

*a* denotes the frame of the machine; *b*, the work-plate. Above the plate are the needle, needle-bar, and presser-foot, and beneath the table the looper and feed-bar, all of these parts being operated in the ordinary manner, a horizontal shaft, *c*, above the table, and a horizontal shaft, *d*, below the table, effecting the respective and relative movements of the needle and the looper and feed-bar, these two shafts being actuated from a driving-wheel, *e*, having a gear, *f*, meshing into pinions *g h* on the shafts *c d*. The wheel *e* has another gear, *i*, meshing into a pinion, *k*, on a shaft, *l*, and this shaft *l* is the cutter-shaft, journaled at its rear end in the frame *a*, and passing over the table or work-plate *b* in a bearing, *m*, on top of which the front part of the shaft is journaled. At the extreme front end of the shaft is the disk-cutter *n*, shown as having a segmental cutting-edge, or a circular cutting-edge, extending almost around it, but broken at one part, as seen at *o*. The better to show the break, the cutter is turned to bring it uppermost; but while all the cutting-edge, or the circular part of the cutter, runs in a groove in the bed *b*, the part *o* (as the wheel brings such part undermost) is above the plane of the table and of the top of the work. The parts are so timed in their respective movements that the part *o* of the wheel is adjacent to the work (or just above the work) when the feed-bar moves to feed the work, the cutting taking place after the feed is effected and the part *o* has risen from the work, and while the work is stationary.

The part *o* may be simply eccentric to the peripheral circular cutting-edge, but it is preferably made straight; and the wheel may be made with several cutting-edges intermitted by breaks, the disk being of such diameter, and its shaft so geared, as to bring a space between two cutting-edges into position next above the work whenever the work is fed.

The bearing for the front end of the shaft *l* form upon or apply to one end of a strong spring, p, the stress of which tends to raise the bearing, and from the bearing I extend a tongue, q, over which an inclined lip, r, on a button or lever, s, slides, to bring down the bearing against the stress of the spring, and hold the cutter-shaft in position for the cutter to act. When the lever-lip is thrown away from the tongue, the spring throws up the bearing and shaft and cutter, the cutter being then out of cutting position, so that work may be freely fed under it, and without being acted upon by it.

To keep the edge of the cutter in good condition, I set into the part of the work-plate that it enters a soft-metal plate, t, in which I make a groove for entrance of the cutting-edge. Sometimes I prefer to arrange the cutting mechanism so that when thrown out of action the whole work-plate may be left free from the appendages of the cutter, to permit the work to be moved over its whole surface; and for this purpose I hang the bearing for the front end of the shaft from the head or part of the frame over the work-plate.

Fig. 4 shows such a modification in which the bearing is so hung, and is also made to be held up out of cutting action by a spring, and to be held down by a lever or other suitable mechanism.

I claim—

In combination with the stitch-forming mechanism, a rotary cutter having part or parts of its edge eccentric to its cutting-edge, substantially as described.

SAMUEL W. SHOREY.

Witnesses:
 FRANCIS GOULD,
 M. W. FROTHINGHAM.